United States Patent [19]
Ernst et al.

[11] 3,874,028
[45] Apr. 1, 1975

[54] BEARING FOR SWIVEL HINGES

[75] Inventors: Horst Ernst, Eltingshausen; Armin Olschewski, Schweinfurt; Manfred Brandenstein, Aschfeld, all of Germany

[73] Assignee: SKF Industrial Trading and Development Company B.V., Amsterdam, Netherlands

[22] Filed: July 26, 1973

[21] Appl. No.: 382,832

[30] Foreign Application Priority Data
Aug. 5, 1972 Germany............................ 7229170

[52] U.S. Cl. ............................................... 16/136
[51] Int. Cl. ............................................ E05d 11/04
[58] Field of Search .................. 16/136, 21; 108/94; 312/252, 11, 203

[56] References Cited
UNITED STATES PATENTS
| | | | |
|---|---|---|---|
| 757,824 | 4/1904 | Martin | 16/21 |
| 924,511 | 6/1909 | Teich | 16/136 |
| 1,796,068 | 3/1931 | Vandermeer | 16/21 |
| 1,885,990 | 11/1932 | Chesnutt | 16/21 |
| 2,947,021 | 8/1960 | Black | 16/21 |

*Primary Examiner*—Paul R. Gilliam
*Assistant Examiner*—Doris L. Troutman
*Attorney, Agent, or Firm*—Murray Schaffer

[57] ABSTRACT

A swivel hinge wherein a pair of cup shaped bearing rings are aligned in the same axial direction and have a plurality of balls arranged therebetween. Each of the bearing rings has an axially outward directed hinge supporting shoulder which is adapted to be received by respective hinge leaves, and a radially outward extending ball race surface supporting the balls. Each of the ball race surfaces terminate in an axially inwardly directed annular flange, the flange of one of the rings overlying and gripping the flange of the other of the rings so as to seal the bearing.

9 Claims, 8 Drawing Figures

BEARING FOR SWIVEL HINGES

BACKGROUND OF THE INVENTION

The present invention relates to an axial and radial bearing for a swivel hinge and in particular to an axial and radial bearing for use in the hinges of doors and the like.

Generally hinges, for instance hinges for the doors of motor vehicles comprise cooperating leaves or strips which are adapted to engage one within the other and are articulatingly held together by a pintle or a bolt extending through the several members. The disadvantage of these hinges lies in the fact that the axial loads placed upon it, for instance due to the dead weight of the door, are transmitted to the engaging surfaces of the leaves which surfaces are adapted to slide or rub against each other. Door hinges, especially those used in motor vehicles, are subject to attack by corroding media such as water, dirt, salt and the like, since the sliding surfaces of the hinge cannot be properly sealed except with immense difficulty. As a result door hinges corrode and disintegrate relatively rapidly, so that after a very short time they can no longer perform their proper swinging movement and after a period of time the hinge may be completely destroyed.

It is the object of the present invention to provide a door hinge and particularly a door hinge for motor vehicles, which overcomes the disadvantages and defects of the prior art.

It is a further object of the present invention to provide a bearing for use in door hinges which greatly increases the life and efficiency of door hinges over those known in the prior art.

It is a further object of the present invention to provide a bearing for use in door hinges which increases the efficiency and life span of such hinges without increasing the space requirement for the same.

It is a specific object of the present invention to provide a bearing for door hinges which is capable of absorbing axial as well as radial loads and which is impervious to corrosive media acting from without the bearing itself.

The above objects, other objects and numerous advantages will be seen from the following disclosure of the present invention.

SUMMARY OF THE INVENTION

According to the present invention the disadvantages of the prior art are overcome and the objects and advantages enumerated above are obtained by a bearing for swivel hinges comprising a pair of cup shaped bearing rings aligned in the same axial direction and between which a plurality of balls are arranged. Each of the bearing rings has an axially outward directed hinge supporting shoulder which is adapted to be received by respective hinge leaves, and a radially outward extending ball race surface supporting the balls. Each of the ball race surfaces terminate in an axially inwardly directed annular flange, the flange of one of the rings gripping the flange of the other of the rings so as to seal the bearing.

The bearing according to the present invention has the advantage of being extremely impervious to the attack of corrosive media because of the overlapping of their annular flanges and the gripping of one with the other. As a result the bearing is self-sealing and can be provided with a life time supply of lubricant. As a result the bearing will have a long and efficient life.

In a particularly advantageous form of the present invention the bearing ring carrying what would be the inner race surface is inverted inwardly in the axial direction so as to form a cylindrical portion which itself forms a portion of the inner race surface. As a result at least the inner race ring is provided with two points of contact with the balls inserted between the race rings. Additionally, the opposite bearing ring is also provided with two race surfaces. When this is so structured the balls are held at four points of contact uniformly spaced thereabout.

In preferred form of the present invention a packing ring is inserted between the bearing rings. The packing functions to seal the interior of the bearing preventing the entry of foreign matter such as dirt, water or lubricant solvent and which serves to seal the interior lubricant within the bearing. The packing further serves to secure the bearing rings together so as to obtain a self-supporting unit which can be easily transported and mounted within any problem and with great ease on the part of the mechanic.

Full details of the present invention are given in the following description of its preferred embodiments and are shown in the accompanying drawings.

DESCRIPTION OF THE INVENTION

Figure 1:
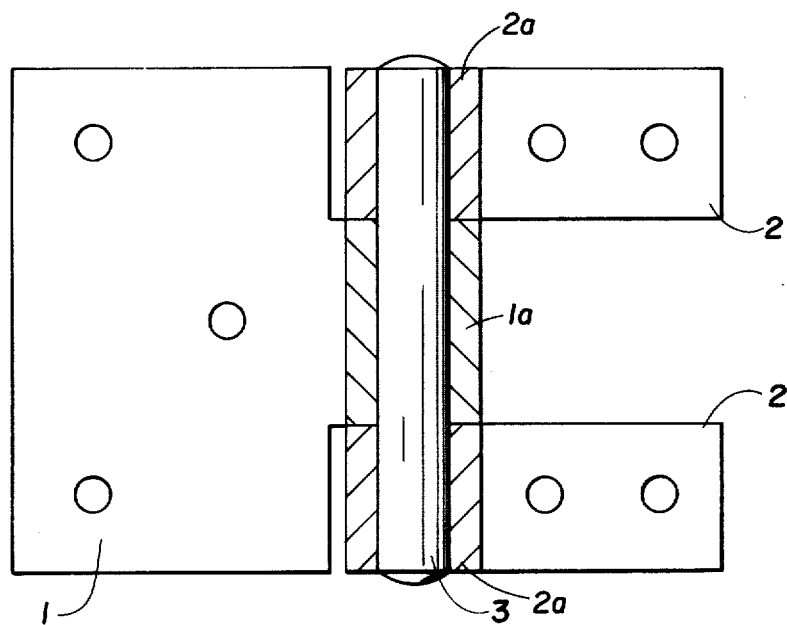
FIG. 1 is a vertical section through a conventional type of the prior art door hinge.

As seen in FIG. 1 the conventional type of door hinge customarily employed in a motor vehicle comprises a large strip or leaf 1 which is normally attached to the door having a central eye portion 1a about which are located a pair of narrower strips or leaves 2 which are normally secured to the vehicle frame or body. The smaller strips 2 may be separable or may be part of an enlarged unitary leaf and are provided with eyes 2a which straddle the central eye 1a of the door leaf 1. The strips 1 and 2 are joined together for articulated movement relative to each other by a pintle or bolt 3.

The drawback of this conventional design resides in the fact that axial forces, for instance those created on account of the dead weight of the cantilevered door, cause sliding friction on the contact surface between the edges of the eyes 1a and 2a which are in contact with each other. Particular stress and strain is placed on the engaging surfaces of the central eye 1a and the lower leaf 2a. A consequence of this frictional engagement is in the rapid wear of the lower leaf 2. This wear is further accelerated by the fact that the engaging surfaces are unprotected to the corrosive and rusting action of water, mainly from melting snow and falling rain, and particularly to the action of water in combination with salt which may be used during the winter to melt the road ice. As a result the life of the hinge is decreased and within a short period of time no longer functions efficiently.

According to the present invention these defects are overcome without major modification of the hinge but by the employment of a bearing member generally defined by the numeral 4 inserted between the central eye 1a of the door leaf 1 and the eye 2a of the lower body leaf 2. The through bolt 3 seen in FIG. 1 is replaced in the embodiment of FIG. 2 with a smaller conically tapered pin 5 which extends through the upper body leaf 2 and only partially through the central bore 6 of the eye 1a. Alignment of the lower body leaf 2 with the central eye 1a is accomplished through the bearing 4 of the present invention which is provided with an axially upwardly extending cylindrical guide lug 7 which enters into the bore 6 of the eye 1a and an axially downwardly extending cylindrical guide lug 8 which enters into the bore 9 of the eye 2a of the lower body leaf 2. The upper inner edge of the surface of the bore 6 of the central eye 1a is tapered to conform with the conical taper on the bolt 5. In this manner the bolt 5 easily seats itself and is automatically self-adjusting on movement of the hinge. In general, however, the upper portion of the hinge is subject only to a fraction of the axial and radial thrust loads and the corrosive action of the weather than is the lower portion of the hinge.

Figure 2:
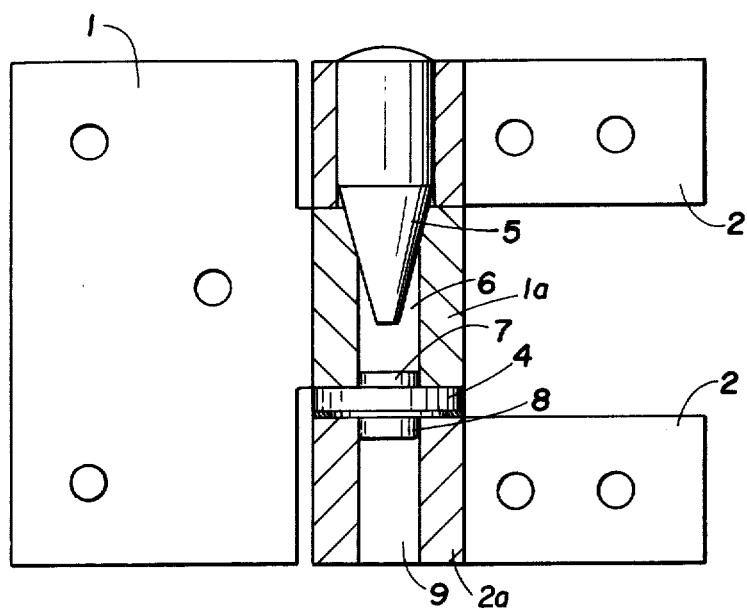
FIG. 2 is a section through a door hinge embodying the bearing according to the present invention.
Figure 3:
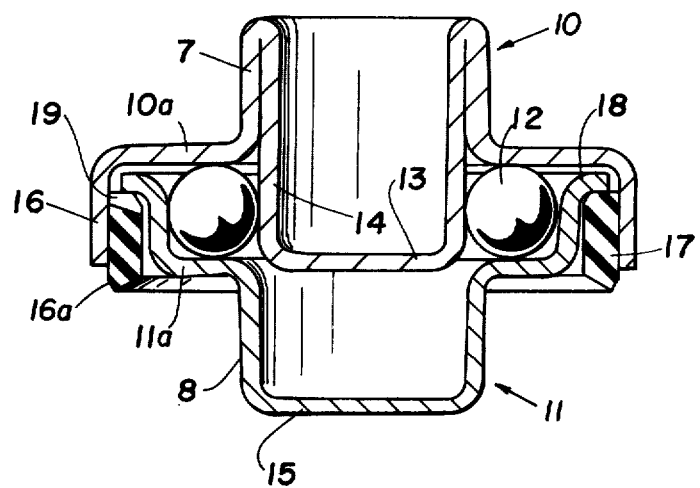
FIG. 3 is a section through one form of the bearing of the present invention.

As seen in FIG. 3 the bearing according to the present invention comprises a first bearing ring 10 forming the inner race member and a second bearing ring 11 forming the outer race member. Between the bearing rings 10 and 11 are located a plurality of balls 12. Each of the bearing rings 10 and 11 is generally cup shaped defining a cylindrical body 7 and 9 respectively closed at one end. The bearing rings 10 and 11 are aligned so that their cups are directed in the same axial direction as if they nested one within the other. The cylindrical portions 7 and 8 form the supporting lugs or shoulders which enter into the bores 6 and 9 respectively of the leaves 1 and 2 as seen in FIG. 2. Each of the bearing rings 10 and 11 is provided with a radially outwardly extending annular shoulder 10a and 11a respectively which form diametrically opposing race surfaces for the balls 12. Each of the annular arms 10a and 11a are provided with a axially inwardly extending flange 16 and 16a respectively. The flange 16 of the inner bearing ring 10 extends over the flange 16a of the outer bearing ring so that the outer bearing ring 11 appears to be nested within the annular flange 16. In general the flanges 16a and 16 engage each other so that the two bearing rings are securely grasped or gripped together so as to form a unitary assembly. The inwardly directed flange 16a of the outer bearing ring serves as a second bearing surface having contact at a point normal to its first race surface. An elastomeric, rubber or plastic ring 17 is wedged between the inwardly directed flanges 16 and 16a which serve both to hold the flanges together and to seal the entry into the interior of the bearing. The bearing may be filled with lubricant of any conventional type.

The bearing rings 10 and 11 are formed from sheet metal or similarly thin walled members and may be molded, extruded and/or pressed into the desired shape and configuration. The bearing rings 10 and 11 are not made by cutting metal or by otherwise working metal in any time consuming expensive process. The inner bearing ring 10 as seen in FIG. 3 may be formed with its cylindrical portion folded over on itself to form the extending lug 7 in a rigid and strong manner. The folding of the thin wall material provides the guide lug of sufficiently strong and very stable character and ensures the cup or pot shape of the bearing ring 10. The outer bearing ring 11 is also formed in the same manner and it too is cup or pot shaped and is provided with a closed bottom 15 which is insertable into the bore 9 of the lower leaf 2.

Preferably as seen in FIG. 3 the inner bearing ring is provided so that its bottom 13 is stretched or elongated so that it extends with a race surface 14 for engagement with the side of the balls 12 themselves. In this manner the bearing takes on the form of a four point bearing in which each of the race rings contacts the balls 12 at two points. These points are diametrically opposed to the similar set of points on the opposite bearing ring. In any event even without the elongation of the bottom 13 of the bearing 10 at least the outer bearing 11 is provided with two point contact so that at the minimum a three point contact is provided with the balls 12. As a result of this multi point contact with the balls the opposite bearing rings 10 and 11 may be tilted with respect to each other as for example under action of the dead weight of the door without loss of contact between the balls 12 and the race surfaces of the bearing rings. Of course both axial and radial load absorption is simultaneously obtained. The bottoms 13 and 15 of each of the cup shaped bearing rings 10 and 11 reinforce and strengthen the body of the bearing rings and also enclose the interior of the structure so that it may be filled with the proper lubricant or permanent grease.

Further the outer bearing ring 11 may be provided with a terminal radially extending flange 18 which overlies the packing 17. This flange 18 acts in combination with the packing 17 to securely lock the outer bearing ring 11 within its nested position in the axial flange 16 of the inner bearing ring 10, thus forming an inseparable unitary assembly and because of the adhesion of the lubricant or grease within the inner space of the bearing to the bottoms 13 and 15 form an additional safeguard against separation during the transport of the bearing.

The packing ring 17 is preferably prestressed in the unassembled state so that when it is placed into its position it becomes stressed and wedged in between the flanges 16 and 16a. The packing 17 is further provided with one or more slots or grooves 19 along its peripheral edge so that should an excess amount of grease or lubricant be put between the bearing rings during assembly the grease or lubricant will be able to be extruded through the grooves 19, thus allowing the bearing to be properly assembled. Further the stressing of the packing ring 17 is allowed by a portion of the packing ring which extends outwardly as seen in FIG. 3 below the edge of the flange 16 and the race surface 11a when the bearing is not yet inserted.

As seen from the above construction a simple axial and radial bearing for swivel hinges is provided in which a pair of cup shaped bearing rings are aligned in the same direction, that is the cups open in the same direction. The bearing rings are provided with an axially outwardly directed hinge supporting lug indicated by 7 and 8 which terminate in radially outwardly extending shoulders which form the ball race surfaces. Each of the ball race surfaces themselves terminate in an axially outwardly directed annular flange in which one nests within the other. The flanges are either caused to grip together or are held in gripping engagement by a packing seal 17 inserted therebetween. Preferably the bearing ring which functions as the inner ring has its cylindrical portion so extending inwardly so that it forms a second race surface. Thus each of the bearing rings is provided with two race surfaces which make point contact with the bearings along normally intersecting diametric lines.

Figure 4A:
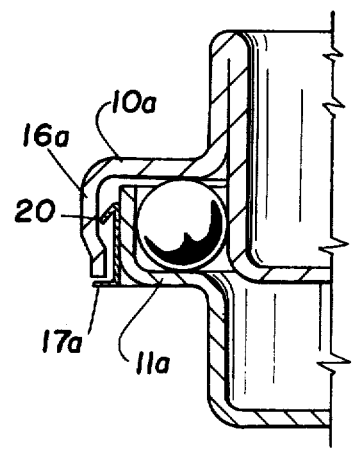
FIGS. 4 through 6 are sectional views similar to that of FIG. 3 showing five further embodiments of the present invention.
Figure 4B:
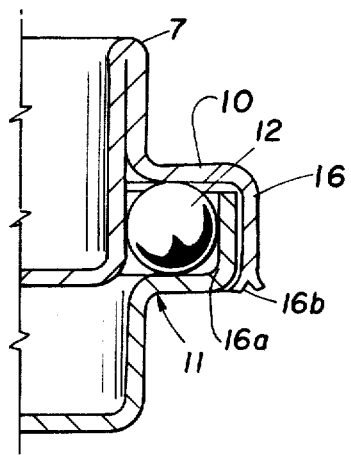

The two embodiments of the bearing as shown in FIGS. 4a and 4b are in general constructed on lines similar to those described in FIG. 3. In the embodiment of FIG. 4a however the packing ring 17a is angularly shaped from a thin elastically resilient packing material which is forced on assembly between the axial flanges 16 and 16a. The packing ring 17a has a barbed hook 20 integrally formed at its upper end which serves to engage the inner surface of the flange 16 so as to securely fix the packing 17a in position. As an additional measure the axial end portion of the flange 16 is stepped radially inward to hold the barb 20.

In the embodiment shown in FIG. 4b a non-contacting gland is formed by the flanges 16 and 16a of the bearing rings 10 and 11 respectively. In order to provide this bearing as a self-supporting assembly the edge of the outer flange 16 is swedged or caulked at 16b along several points on its periphery. The swedging or caulking 16b extends over the lip of the flange 16a and thus holds the two members together without the use of a compressive packing such as 17.

Figure 5A:
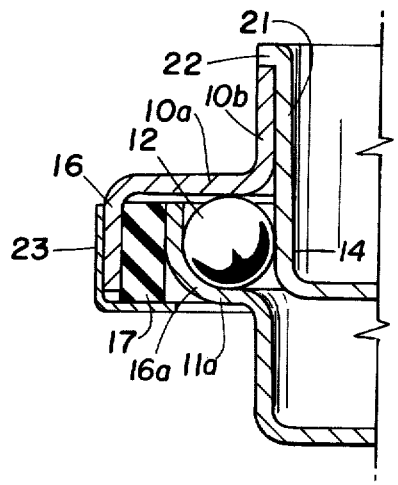
Figure 5B:
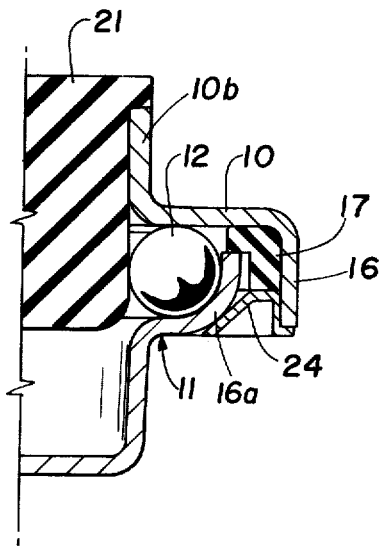

In the embodiments represented in FIGS. 5a and 5b the balls have a two point contact with the surfaces 10a and 14 of the inner bearing ring 10 and a multi point contact along an arc with the bearing surface 11a of the outer bearing ring 11. A further distinction is that in each of the embodiments of FIGS. 5a and 5b the inner race ring 10 is formed of two parts, a central cylindrical portion 21 having an outwardly directed shoulder 22 at its upper end and a angular shaped member 10b which forms the bearing surfaces 10a. The outwardly directed flanged end 22 cooperates with the angular portion 10b to form the lug 7 which is insertable in the bore 6 as seen in FIG. 2.

In the embodiment of FIG. 5a an annular packing ring 17 is inserted between the axially extending flanges 16 andn 16a of the bearing rings 10 and 11 respectively. The packing ring 17 is held by a right angle ring 23 which grips the surface of the flange 16 at its outer periphery.

In the modification shown in FIG. 5b the bearing ring 10 forming the inner race is also made in two parts. However, its inner section or cylindrical section 21 is solid in contrast to the hollow cup shape of FIG. 5a and FIGS. 3 and 4. The solid central portion 21 may be made of any material including steel, plastic or other synthetic material since it absorbs extremely little stress and strain, the major portion of the stress and strain being absorbed by the angular race member 10b which is formed of the sheet metal. As a result the form taken in FIG. 5b may be of particularly low cost. An angular packing ring 17b is inserted between the flange members 16 and 16a, one portion of the packing member lying between the edge of the flange 16a and the surface of the race 10b. The packing 17 may be fixed by an annular securing ring 24 which is bent at a plurality of points along its periphery so as to be spring loaded with respect to the flanges 16 and 16a.

Figure 6:
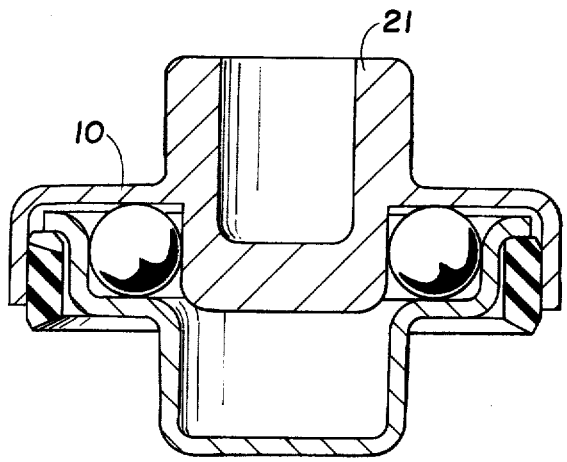

The embodiment as seen in FIG. 6 is adapted for incorporation in a hinge system which requires a relatively stronger construction than the previous embodiments owing to the higher stresses and strains which may be placed upon it. For this purpose, the inner bearing ring 10 is extruded so that its cup shaped central portion 21 has a relatively thick wall rather than the thin wall section shown in FIGS. 3, 4 and 5a. Otherwise the bearing member as seen in FIG. 6 is similar in construction to that shown in FIG. 3 and functions in the same way.

The bearing according to the present invention is emanently suitable for incorporation of door hinges of motor vehicles. It is not however confined to this application but can be employed wherever swiveling movements having large radial and axial forces occur. Each of the embodiments in addition permit a small degree of angular or tilting moment relatively between the bearing rings and each of the embodiments can be made simply and economically.

Various modifications and changes have been suggested. Other such changes and modifications will be apparent to those skilled in this art. Accordingly, the present disclosure is intended to be illustrative of the present invention and not limiting of it.

What is claimed:

1. An axial and radial bearing for a swivel hinge comprising a pair of cup shaped bearing rings aligned in the same axial direction and a plurality of balls arranged therebetween, each of said bearing rings having an axially outwardly directed cylindrical portion concentric with the axis of the bearing and closed at one end forming a supporting lug said supporting lug being inserted in said hinge, said supporting lug having radially outwardly extending shoulders forming ball race surfaces, each of said shoulders terminating in an axially inwardly directed annular flange, the flange of one of said rings nesting within the other and means for securing the flange of one of the rings to that of the other of said rings.

2. The bearing according to claim 1 wherein said one of said bearing rings is inverted axially inward to form a cylindrical portion forming an inner race surface engaging said balls.

3. The bearing according to claim 1 wherein said bearing rings are made of sheet metal.

4. The bearing according to claim 1 including a packing ring inserted between the axially extending flanges of said bearing rings.

5. The bearing according to claim 1 wherein at least one of said bearing rings provides a two point contact with said balls.

6. The bearing according to claim 1 wherein at least one of the bearing rings has a cup shaped central portion of a thicker wall section than the radially extending shoulders.

7. The bearing according to claim 1 wherein the bearing ring forming the inner race member is formed in two parts.

8. The bearing according to claim 1 wherein the central cylindrical portion of the cup shaped bearing is solid.

9. A door hinge comprising a first leaf member adapted to be attached to a door and a second leaf member adapted to be attached to a supporting jamb, said first and second members being joined for swinging movement relative to each other, a bearing according to claim 1 arranged between each of said members to absorb axial and radial loads.

* * * * *